(No Model.)

C. E. PATRIC.
SEEDING MACHINE.

No. 331,157. Patented Nov. 24, 1885.

Witnesses.
J. C. Turner
W. E. Chaffee

Inventor
C. E. Patric
By his atty
R. D. O. Smith (No Model.)

C. E. PATRIC.
SEEDING MACHINE.

No. 331,157. Patented Nov. 24, 1885.

Witnesses
J. C. Turner
W. Chaffe

Inventor
C. E. Patric
By his Atty
R. D. O. Smith

UNITED STATES PATENT OFFICE.

CHARLES E. PATRIC, OF SPRINGFIELD, OHIO.

SEEDING-MACHINE.

SPECIFICATION forming part of Letters Patent No. 331,157, dated November 24, 1885.

Application filed November 3, 1884. Serial No. 147,100. (No model.)

*To all whom it may concern:*

Be it known that I, CHARLES E. PATRIC, of Springfield, in Clark county, Ohio, have invented new and useful Improvements in Seeding-Machines; and I do hereby declare that the following is a full and accurate description of the same.

Heretofore, so far as I am aware, the crank-bars whereby the several hoes of the rank have been lifted have been unsupported, except at their ends, and as a consequence it has been necessary to make said bars larger than would be required to lift and sustain the hoes, in order that torsional twist should not cause some of the hoes to be less elevated than others.

So far as I am aware, the feed mechanism has never heretofore been thrown automatically in and out of gear with both wheels by a device for raising and lowering of the hoes.

That my invention may be fully understood, I will particularly describe the construction of my devices, as I have preferred to make them, without, however, being confined to the details shown, all of which may be varied without changing their mode of operation.

Figure 1:
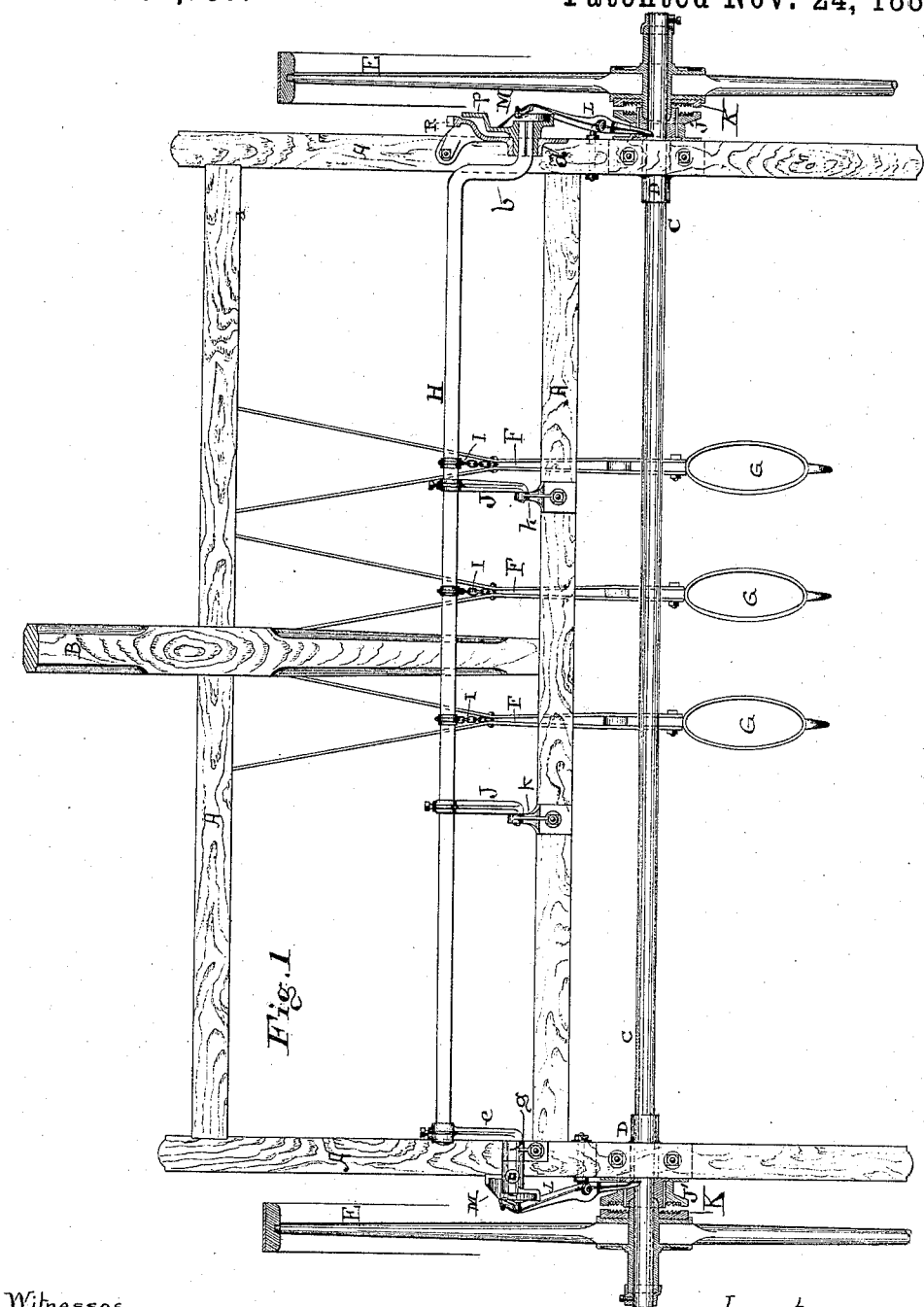
Figure 2:
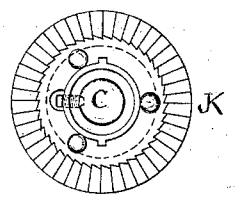
Figure 3:
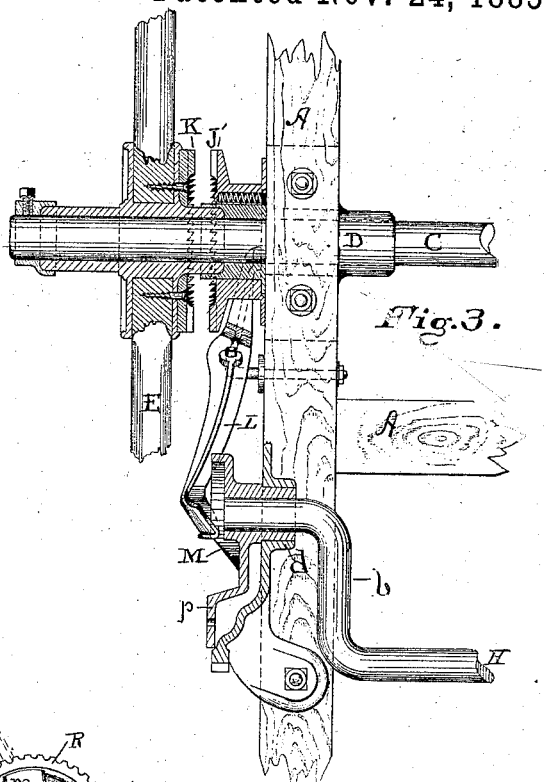
Figure 4:
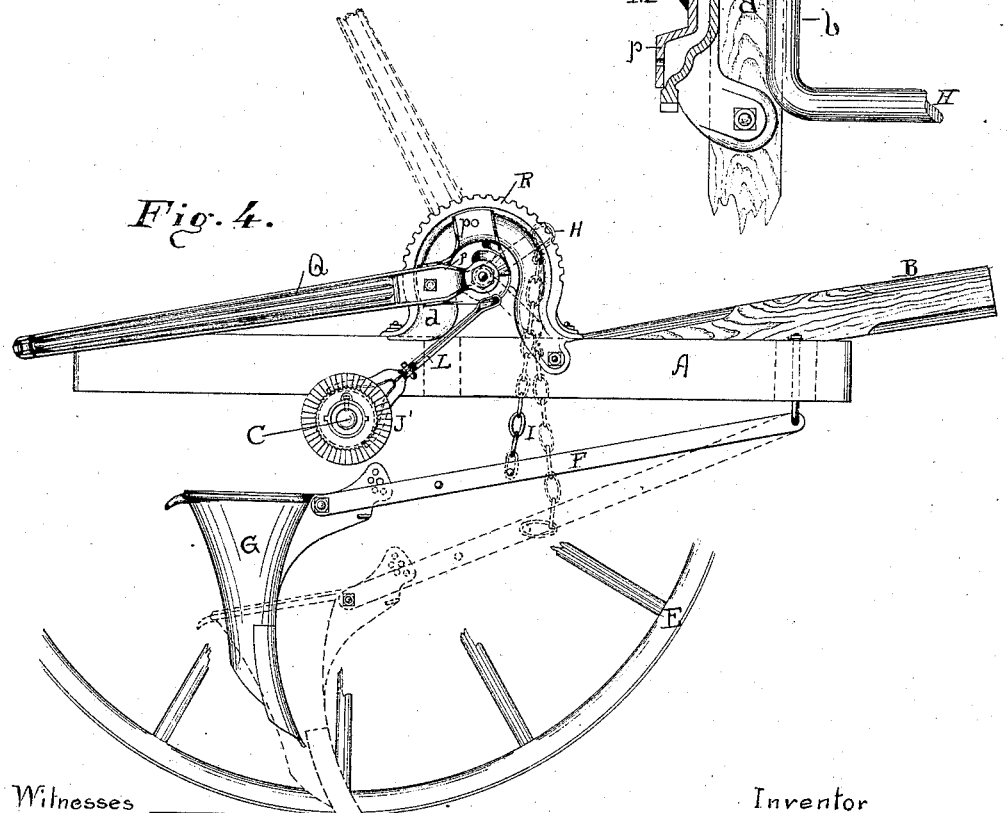

Reference is had to the accompanying drawings, in which Figure 1 is a plan of the frame of the running-gear, parts being shown in section. Fig. 2 is an elevation of the ratchet-clutch. Fig. 3 is a detailed view, partly in section, showing the clutch, clutch-lever, and its operative cam. Fig. 4 is a side elevation of the same.

A A is the ordinary frame, and B is the draft pole or tongue. The seed-hopper is not shown, as no part of it enters into this invention. It is, however, mounted upon the frame A in the usual way.

C is the main axle. It is mounted to turn in bearings D D, rigidly attached to the frame A. The bearing-wheels E turn loosely upon said axle, but by means of clutches may be locked to the axle at will, so as to cause it to turn with said wheels.

Power to drive the seeding-cups and other mechanism required for the distribution of the seeds and fertilizer is transmitted from the axle C; but said seeding mchanism and the connections that carry power from said axle to said seed-cups are not shown, because they do not enter into this invention, and it is not required that they shall be shown, nor further alluded to.

F F are drag-bars, attached at their forward ends to the frame A, and at their rear ends to the hoes G G. These drag-bars and hoes do not differ from those in common use, and are lifted and sustained, when required, by a crank-bar, H, and chains I. As before stated, the torsion of a bar, H, of sufficient size only to sustain the weight of the hoes would, at the end farthest from the point where force is applied to said bar, cause the hoes to sink much below the hoes at the opposite end. In other words, the hoes would not all be carried equally high; and this makes it necessary to increase the size and weight of the crank-bar to such dimensions as will diminish the torsional twist to immaterial proportions. It is of course objectionable to have so large and heavy a bar, and I have therefore made the bar H of small size—say one inch square or round iron. For convenience, I give it the crank-bend *b* at one end, and provide a suitable bearing for it in the box *d*, secured to the frame A. At its other end said bar H is inserted and rigidly secured to the crank-arm *e*, the center of motion of which is the box *g*, also secured to the frame A.

Along the line of the crank-bar H, I place two or more arms, J J, which are properly spaced and rigidly secured to the crank-bar. The outer ends of the arms are jointed to suitable bearings, *k k*, all in axial line with the axes of the boxes *d* and *g*. The effect of these braces is to support the bar H and prevent torsional twist or reduce it to an immaterial quantity by shortening the length of rod, which can be effected to that length which is between two adjacent bearings.

As before stated, the wheels E revolve freely on the axle C, but may be locked thereto by sliding clutches J′, which are attached to the axle by spline and feather or by other means which will permit said clutches to slide freely endwise as to said shaft, but will not permit it to rotate independently of the axle. The clutch-collars J′ are provided with the usual radial ratchet-toothed face, which at the proper time engages with a similarly-provided plate, K, attached rigidly to the inner face of the hub of each wheel E, so that either or both of said wheels may become driving-wheels for the axle C and mechanism actuated by it.

Each one of the clutch-collars J is provided with a clutch lever or fork, L, hinged to the frame A, and its outer end in engagement with the cam M, which is operated by the lifting-bar H, so that whenever said bar and the hoes are lifted the clutches are retracted and the wheels E are liberated, and when said hoes are lowered to the ground the clutches are moved out into engagement with the wheels. One of the plates, which constitutes a cam, M, is also provided with lugs or ears $p$, for attachment of the lever Q, whereby the attendant raises or lowers the bars H with the hoes attached. Said lever is provided with the ordinary latch-bolt, which engages with the notches of the keeper R; but it is sometimes desirable that the lever Q shall be located conveniently for a person riding on the machine, and sometimes for a person walking on the ground. I therefore extend the notched surface of the keeper over a longer range than would be necessary for a lever in either one of those positions alone, and provide two lugs $p$, to either one of which the lever Q may be attached, and thus be placed in either position desired.

The clutches J' are provided with springs behind or within them, so that they may yield to permit the revolution of the axle when one wheel ceases to revolve as fast as the other, as in advancing along a curve, or to permit the wheels to revolve backward freely in backing the machine.

Having described my invention, I claim—

1. The hoes G, their lifting-chains, and the lifting crank-bar H, combined with arms J, rigidly secured to said crank-bar intermediate its ends, and jointed to the frame on the same axial line as the said crank-bar, for the purpose set forth.

2. The crank-bar H, with the crank-bend $b$ at one end resting in the bearing $d$, combined with the arm $e$, rigidly secured to end of said crank-bar, and resting in the box $g$, whereby the arms J, lifting-chains, thimbles, &c., may be easily put on and off said crank-bar.

3. In a seeding-machine, a series of seed-cups and force-feed distributers, and a main axle or shaft, whereby power is transmitted to drive the seed-cups and distributers, provided at each end with a bearing-wheel, combined with clutches attached to said wheels, and clutch-collars adapted to simultaneously engage said clutches, whereby one or both of said wheels automatically may act as drivers for said shaft, as set forth.

4. A seeding-machine wherein there is a series of seed-cups and force-feed distributers, and a main shaft to receive and transmit motion to the feed-wheels and the supporting and carrying wheels, each provided with a spring-clutch, combined with clutch-levers and a cam-bar, whereby said clutches may be simultaneously operated, and said wheels may be caused to engage and drive said shaft at both ends, as set forth.

5. In combination, in a seeding-machine, a main shaft to receive and transmit motion to the feed-wheels, the bearing-wheels, each provided with a clutch, and a cranked lifting-bar, H, to raise or lower the hoes, a cam, M, at each end of said lifting-bar, and the clutch-levers L, pivoted to the frame and actuated by said cams, whereby the turning of said bar to raise or lower the hoes automatically and simultaneously moves said notches out of or into engagement, as set forth.

6. The lifting crank-bar H, combined with the clutches J K, whereby the wheels E are locked to the axle C, and the clutch-levers L, in engagement with said crank-bar, so as to be actuated by it to control said clutches and move them into engagement when said crank is lowered and move them out of engagement when said crank is raised.

7. The lifting crank-bar H, provided at one end with two lugs, $p\, p$, each adapted to receive and hold the hand-lever Q, whereby said lever may be set in position convenient for operation from the driver's seat or from the ground, as set forth, combined with the arched rack or latch-plate R, with notches wherewith the hand-lever latch will engage with the lever in either position, as set forth.

CHARLES E. PATRIC.

Witnesses:
ROBT. C. RODGERS,
A. P. LINN COCHRAN.